US012623300B2

(12) United States Patent
Seo et al.

(10) Patent No.: US 12,623,300 B2
(45) Date of Patent: May 12, 2026

(54) METHOD FOR MANUFACTURING JOINED BODY, AND JOINING DEVICE

(71) Applicant: NIPPON LIGHT METAL COMPANY, LTD., Tokyo (JP)

(72) Inventors: Nobushiro Seo, Shizuoka (JP); Shingo Koizumi, Shizuoka (JP)

(73) Assignee: NIPPON LIGHT METAL COMPANY, LTD., Tokyo (JP)

( * ) Notice: Subject to any disclaimer, the term of this patent is extended or adjusted under 35 U.S.C. 154(b) by 10 days.

(21) Appl. No.: 18/566,545

(22) PCT Filed: May 12, 2022

(86) PCT No.: PCT/JP2022/020053
§ 371 (c)(1),
(2) Date: Dec. 1, 2023

(87) PCT Pub. No.: WO2022/259812
PCT Pub. Date: Dec. 15, 2022

(65) Prior Publication Data
US 2024/0253150 A1      Aug. 1, 2024

(30) Foreign Application Priority Data

Jun. 7, 2021      (JP) ................................. 2021-095105

(51) Int. Cl.
*B23K 20/00* (2006.01)
*B23K 20/12* (2006.01)

(52) U.S. Cl.
CPC ........ *B23K 20/1225* (2013.01); *B23K 20/125* (2013.01); *B23K 20/126* (2013.01)

(58) Field of Classification Search
CPC .......................... B23K 20/126; B23K 20/1255; B23K 20/122; B23K 20/125; B23K 20/1225;

(Continued)

(56) References Cited

U.S. PATENT DOCUMENTS 6,237,832 B1 *   5/2001   Chung ................... B23K 3/087
228/43
6,360,937 B1 *   3/2002   De Koning ........ B23K 20/1235
228/2.1

(Continued)

FOREIGN PATENT DOCUMENTS

CN          201500867 U      6/2010
CN          108349041 A      7/2018
(Continued)

OTHER PUBLICATIONS

International Search Report and Written Opinion for International Patent Application No. PCT/JP2022/020053 (Jul. 26, 2022).

(Continued)

*Primary Examiner* — Erin B Saad
(74) *Attorney, Agent, or Firm* — Merchant & Gould P.C.

(57) ABSTRACT

There is provided a method for manufacturing a joined body using a rotary tool with a stirring pin to perform friction stirring on a composite body having a first surface and a second surface that is different from the first surface. In the composite body, metal members are combined together in a joined arrangement. The method includes the steps of: forming the composite body by combining the metal members in the arrangement; fixing the composite body in a state where the metal members are combined together; performing friction stir welding by inserting the stirring pin through the first surface into the composite body that has been fixed; rotating the fixed composite body such that the second surface is in a positional relationship to face the rotary tool; and performing friction stir welding by inserting the stirring pin through the second surface into the fixed composite body.

9 Claims, 10 Drawing Sheets

(58) Field of Classification Search
CPC .............. B23K 20/129; B23K 37/0443; B23K
37/0435
See application file for complete search history.

(56) References Cited

U.S. PATENT DOCUMENTS

| | | | | |
|---|---|---|---|---|
| 7,048,174 | B2* | 5/2006 | Buchheit | B23K 37/0435 228/49.3 |
| 7,455,211 | B2* | 11/2008 | Kay | B23K 20/1265 228/112.1 |
| 7,464,853 | B2* | 12/2008 | Buchheit | B23K 20/126 228/112.1 |
| 7,721,938 | B2* | 5/2010 | Nagano | B23K 20/126 228/44.3 |
| 7,980,538 | B1* | 7/2011 | Weiby | B25B 1/103 248/680 |
| 8,164,021 | B1* | 4/2012 | Ferrando | B23K 20/1255 228/2.1 |
| 9,050,688 | B2* | 6/2015 | Yamaguchi | B23K 20/125 |
| 9,393,633 | B2* | 7/2016 | Blais | H01L 24/75 |
| 2003/0209586 | A1* | 11/2003 | Thompson | B23K 20/123 228/2.1 |
| 2005/0040209 | A1* | 2/2005 | Stotler | B23K 20/123 228/2.1 |
| 2005/0045693 | A1* | 3/2005 | Buchheit | B23K 37/0408 228/112.1 |
| 2005/0133567 | A1* | 6/2005 | Runyan | B23K 20/1265 228/112.1 |
| 2005/0139640 | A1* | 6/2005 | Kay | B23K 20/1265 428/615 |
| 2006/0169740 | A1* | 8/2006 | Fukuhara | B23K 20/1265 228/2.1 |
| 2006/0208040 | A1* | 9/2006 | Buchheit | B23K 20/126 228/112.1 |
| 2007/0119276 | A1* | 5/2007 | Liu | C22C 29/16 75/232 |
| 2008/0230972 | A1* | 9/2008 | Ganley | B25B 5/147 269/287 |
| 2009/0230264 | A1* | 9/2009 | Provitola | B25B 5/10 248/229.2 |
| 2010/0096438 | A1* | 4/2010 | Sato | B23K 20/122 228/114 |
| 2010/0140321 | A1* | 6/2010 | Eller | B23K 20/1255 228/2.1 |
| 2011/0049221 | A1* | 3/2011 | Blais | H01L 24/81 228/101 |
| 2012/0292080 | A1* | 11/2012 | Kahl | B32B 15/017 228/115 |
| 2014/0166731 | A1* | 6/2014 | Seo | B23K 20/1265 228/112.1 |
| 2015/0224595 | A1* | 8/2015 | Johnson | B23K 20/123 228/114.5 |
| 2015/0273623 | A1* | 10/2015 | Kato | B23K 20/126 269/296 |
| 2015/0336204 | A1* | 11/2015 | Singh | B23K 20/129 228/101 |
| 2017/0110940 | A1* | 4/2017 | Ohashi | B23K 20/122 |
| 2017/0209957 | A1* | 7/2017 | Sato | B21D 22/14 |
| 2017/0304934 | A1* | 10/2017 | Carlson | B23K 20/1265 |
| 2019/0283174 | A1* | 9/2019 | Onose | B23K 20/1265 |
| 2020/0384569 | A1* | 12/2020 | Singh | B23K 20/122 |
| 2021/0016388 | A1 | 1/2021 | Hori et al. | |
| 2024/0009754 | A1* | 1/2024 | Seo | B23K 20/24 |
| 2025/0153268 | A1* | 5/2025 | Liu | B23K 20/1255 |

FOREIGN PATENT DOCUMENTS

| | | | | |
|---|---|---|---|---|
| CN | 212286516 U | 1/2021 | | |
| CN | 213163922 U | 5/2021 | | |
| JP | 11128083 A | * 5/1999 | .......... | B23K 20/122 |
| JP | 2001-121276 A | 5/2001 | | |
| JP | 2010-274320 A | 12/2010 | | |
| JP | 2017-121641 A | 7/2017 | | |
| JP | 2020-175396 A | 10/2020 | | |

OTHER PUBLICATIONS

Extended European Search Report issued for European Patent Application No. 22819995.6, date of mailing: Dec. 17, 2025, 16 pages.
Office Action issued for Chinese Patent Application No. 202280027924.3, Jan. 20, 2026, 17 pages, with English translation.

* cited by examiner

METHOD FOR MANUFACTURING JOINED BODY, AND JOINING DEVICE

This application is a National Stage Application of PCT/JP2022/020053, filed May 12, 2022, which claims the benefit of priority to Japanese Patent Application No. 2021-095105, filed Jun. 7, 2021, and which applications are incorporated herein by reference. To the extent appropriate, a claim of priority is made to each of the above disclosed applications.

TECHNICAL FIELD

The present invention relates to a method for manufacturing a joined body and a joining device.

BACKGROUND ART

Friction stir welding is performed on a composite body obtained by combining joint members through butting or overlapping. When performing such friction stir welding, it is common to place the joint members on a backing plate to form a composite body and then fix the composite body using clamps or jigs. Subsequently, friction stir welding is performed on the fixed joint members. Moreover, friction stir welding is also performed on the front side and the back side of the composite body in the case of combining joint members of the composite body (see, for example, Patent Literature 1). In this case, first, the joint members are placed on the backing plate to form the composite body, and it is fixed, and friction stir welding is then performed on the front side (first surface side) of the fixed composite body. After friction stir welding on the front side, the fixation is released, and the joint members are each turned over, re-positioned on the backing plate, and the composite body is formed again and fixed. Subsequently, friction stir welding is performed on the fixed joint members on the back side (second surface side).

CITATION LIST

Patent Literature

Patent Literature 1: JP 2010-274320 A

SUMMARY OF INVENTION

Technical Problem

In conventional methods, by performing friction stir welding on the front side, due to the influence of the frictional heat generated by the friction stirring, the front side of the composite body contracts, causing compressive stress on the first surface side of the composite body and tensile stress on the second surface side that is different from the first surface. When the fixation of the composite body is released in this state, due to the compressive stress and tensile stresses, the composite body undergoes deformation, curving concavely toward the front side and convexly toward the back side. Then, in the case of overturning and re-positioning the composite body whose fixation has once been released, the height and position of the site where friction stir welding is performed will change due to the deformation of the composite body from its original shape. Additionally, since each of the joint members has been deformed, there are cases where it becomes impossible to combine the joint members in their initial arrangement. In this case, the conditions of friction stir welding, such as the insertion depth and insertion position of the stirring pin of the rotary tool, may change, leading to unsatisfactory joining results. Therefore, adjustments to the insertion depth and insertion position of the stirring pin become necessary. Furthermore, attempting to correct the deformed joint members or fixing the placed joint members in order to suppress deformation can result in decreased productivity due to the required time and effort.

From these perspectives, the present invention aims to provide a method for manufacturing a joined body and a joining device that can perform friction stir welding on a composite body having a first surface and a second surface that is different from the first surface, while suppressing adverse effects of deformation in the composite body caused by friction stir welding on the first surface and enabling friction stir welding on the second surface.

Solution to Problem

An aspect of the present invention is a method for manufacturing a joined body using a rotary tool with a stirring pin to perform friction stirring on a composite body having a first surface and a second surface that is different from the first surface, wherein in the composite body, metal members are combined together in a joined arrangement, the method comprising: an arrangement step of forming the composite body by combining the metal members in the arrangement; a fixing step of fixing the composite body in a state where the metal members are combined together; a first friction stirring step of performing friction stir welding by inserting the stirring pin through the first surface into the composite body that has been fixed; a rotating step of rotating the fixed composite body such that the second surface is in a positional relationship to face the rotary tool; and a second friction stirring step of performing friction stir welding by inserting the stirring pin through the second surface into the fixed composite body.

In the method for manufacturing a joined body according to the present invention, it is preferable that in the arrangement step, the metal members are arranged such that the first surface faces the rotary tool.

In the method for manufacturing a joined body according to the present invention, it is preferable that after the fixing step, the method further includes a placing step of placing the fixed composite body such that the first surface is in a positional relationship to face the rotary tool.

In the method for manufacturing a joined body according to the present invention, it is preferable that the fixing step includes fixing the composite body by holding a peripheral area along a friction stirring site on the first surface.

In the method for manufacturing a joined body according to the present invention, it is preferable that the fixing step includes fixing the composite body by holding an entire first surface except a friction stirring site on the first surface.

In the method for manufacturing a joined body according to the present invention, it is preferable that the fixing step includes fixing the composite body by sandwiching it between the first surface and a site of the composite body opposite to the first surface.

In the method for manufacturing a joined body according to the present invention, it is preferable that the fixing step includes fixing the composite body by sandwiching it between an entire first surface except a friction stirring site on the first surface and an entire second surface except a friction stirring site on the second surface opposite to the first surface of the composite body.

In the method for manufacturing a joined body according to the present invention, it is preferable that the arrangement step includes overlapping the metal members on each other to form the composite body having an overlapped portion on the first surface or the second surface, in which the metal members are overlapped on each other, and the first friction stirring step or the second friction stirring step includes performing friction stir welding by inserting the stirring pin through the overlapped portion.

In the method for manufacturing a joined body according to the present invention, it is preferable that the arrangement step includes butting the metal members against each other to form the composite body having a butted portion on the first surface or the second surface, in which the metal members are butted against each other, and the first friction stirring step or the second friction stirring step includes performing friction stir welding by inserting the stirring pin through the butted portion.

A second aspect of the present invention is a joining device that uses a rotary tool with a stirring pin to perform friction stirring on a composite body having a first surface and a second surface that is different from the first surface, wherein in the composite body, metal members are combined together in a joined arrangement, the joining device comprising: a fixing tool that fixes the composite body in a state where the metal members are combined together; the rotary tool that performs friction stir welding on the metal members; and a rotary mechanism that rotates the composite body having been fixed such that the first surface or the second surface is in a positional relationship to face the rotary tool.

In the method for manufacturing a joined body according to the present invention, it is preferable that the fixing tool is a member that fixes the composite body by fastening it in a sandwich state, or a clamp that is movable between a clamp state to clamp the composite body and a release state to release the composite body.

In the method for manufacturing a joined body according to the present invention, it is preferable that the fixing tool fixes the composite body by holding a peripheral area along a friction stirring site on the first surface.

In the method for manufacturing a joined body according to the present invention, it is preferable that the fixing tool is a member that fixes the composite body by holding an entire first surface except a friction stirring site on the first surface.

In the method for manufacturing a joined body according to the present invention, it is preferable that the fixing tool is a member that fixes the composite body by sandwiching it between the first surface and a site of the composite body opposite to the first surface.

In the method for manufacturing a joined body according to the present invention, it is preferable that the fixing tool is a member that fixes the composite body by sandwiching it between an entire first surface except a friction stirring site on the first surface and an entire second surface except a friction stirring site on the second surface opposite to the first surface of the composite body.

Advantageous Effects of Invention

According to the manufacturing method and joining device for a joined body according to the present invention, it is possible to suppress adverse effects of deformation in the composite body by a first friction stirring step when performing a second friction stirring step on a second surface subsequent to the first friction stirring step on a first surface.

DESCRIPTION OF EMBODIMENTS

In accordance with an embodiment of the present invention, explanations will be given while referring to the accompanying drawings as needed. The present invention is not limited to only the following embodiment. Moreover, components in the embodiment and modifications thereof can be appropriately combined in part or in whole.

Figure 1:
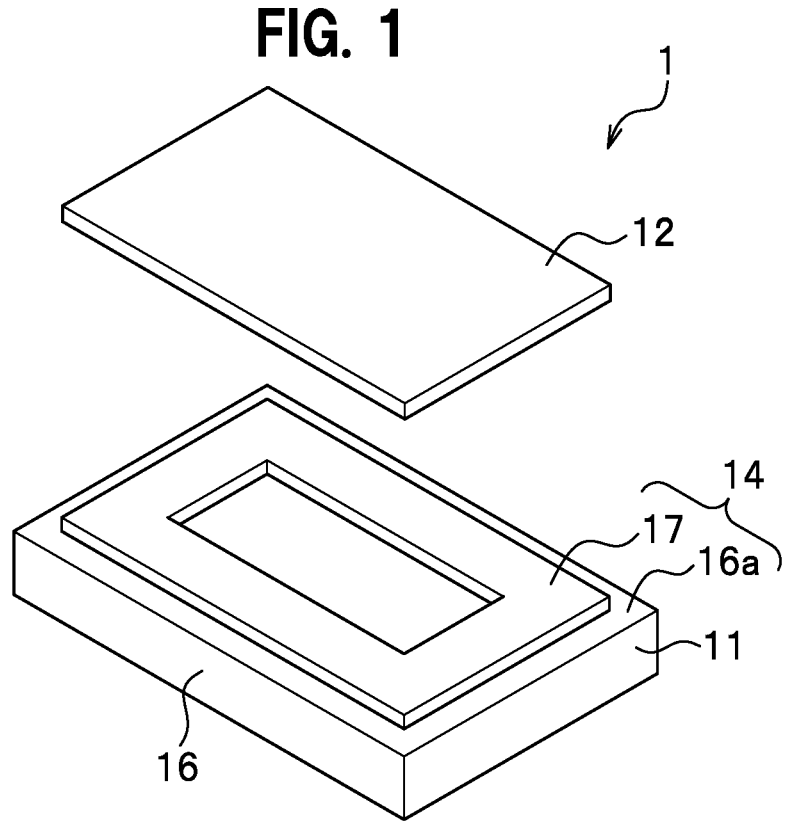
FIG. 1 is an exploded perspective view of the first surface side of a joined body according to one embodiment of the present invention.
Figure 2:
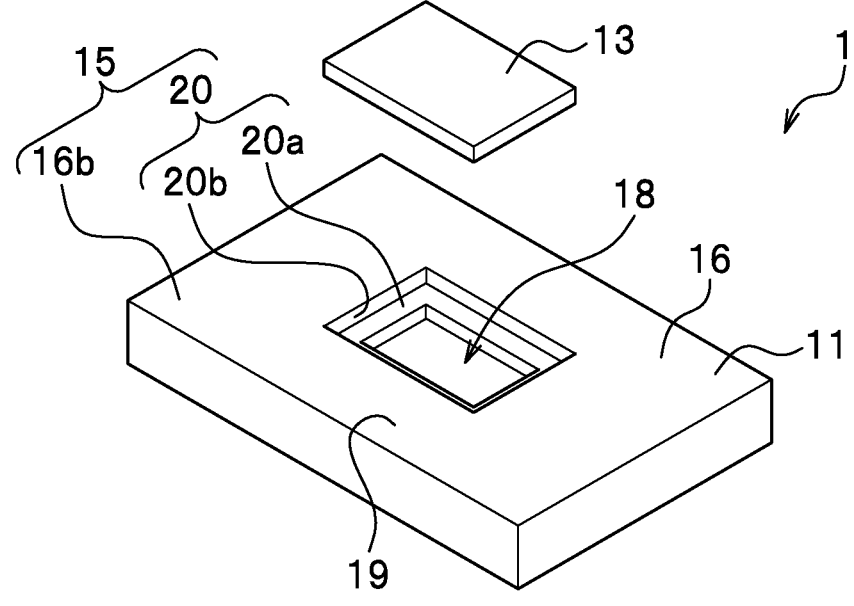
FIG. 2 is an exploded perspective view of the second surface side of the joined body according to the embodiment of the present invention.

In the present embodiment, for example, an explanation of a joined body is provided using the example of a liquid-cooling jacket that cools a heating element placed by circulating a fluid internally. The joined body is constructed by joining metal members through friction stir welding. Specifically, as shown in FIGS. 1 and 2, a joined body 1 includes a first metal member 11, a second metal member 12, and a third metal member 13. The second metal member 12 is friction stir welded to a front surface 14 on the first surface side of the first metal member 11, and the third metal member 13 is friction stir welded to a back surface 15 on the second surface side of the first metal member 11. Note that in the present embodiment, the "front surface" refers to the side opposite to the "back surface.

The first metal member 11 is constituted with a frame portion 17 and a recess portion 18 formed on a main body portion 16. The first metal member 11 is not particularly limited as long as it is made of metal capable of friction stirring. In the present embodiment, the first metal member 11 is primarily composed of an aluminum alloy. The aluminum alloy is, for example, formed using aluminum alloy casting materials such as JISH5302 ADC12 (Al—Si—Cu series).

The main body portion 16 is a plate-like member exhibiting a rectangular shape in a plan view. The frame portion 17 is a site that supports the second metal member 12. The frame portion 17 is formed on the surface of the main surface 16a on the first surface side of the main body portion 16 and protrudes from the main surface 16a by a predetermined height. The frame portion 17 exhibits a rectangular frame shape in a plan view, and its outer peripheral edge is formed with an offset inward from the outer peripheral edge of the main body portion 16. The frame portion 17 is integrally molded with the main body portion 16 by die casting. In the present embodiment, the front surface 14 on the first surface side of the second metal member 12 includes the surface of the main surface 16a on the side provided with the frame portion 17 of the main body portion 16, and the surface of the frame portion 17.

The recess portion 18 exhibits a rectangular shape in a plan view and is formed on the surface of the main surface 16b on the second surface side of the main body portion 16. By forming the recess portion 18, a peripheral wall portion 19 in a rectangular frame shape is formed around the recess portion 18 (peripheral edge of the main body portion 16). A peripheral wall step portion 20 is formed on the inner peripheral edge of the peripheral wall portion 19. The peripheral wall step portion 20 includes a step bottom face 20a and a step side face 20b that rises from the step bottom face 20a. Note that the step side face 20b rises perpendicularly from the step bottom face 20a, but may rise while tilting outward. In the present embodiment, the back surface 15 of the second metal member 12 includes the surface of the peripheral wall portion 19 corresponding to the main surface 16b on the side provided with the recess portion 18 of the main body portion 16, the surface of the recess portion 18, and the surface of the peripheral wall step portion 20.

The second metal member 12 is a lid provided on the surface 14 of the first metal member 11 and seals the space surrounded by the frame portion 17. The second metal member 12 is not particularly limited as long as it is a metal capable of friction stirring, but in the present embodiment, it is formed from a metal equivalent to the first metal member 11. Note that the second metal member 12 can be formed from an aluminum alloy having hardness lower than the first metal member 11. In this case, the aluminum alloy may be, for example, JIS A1050, A1100, A6063, and the like. The second metal member 12 has a rectangular plate shape in a plan view and possesses an outer peripheral shape equivalent to the outer peripheral shape of the frame portion 17. The second metal member 12 is mounted on the frame portion 17, forming an overlapped portion 21 between the upper surface of the frame portion 17 and the lower surface of the peripheral edge of the second metal member 12 (see FIGS. 6A and 6B and 9). By inserting a stirring pin 51 of the rotary tool 50 from the side of the second metal member 12, the first metal member 11 and the second metal member 12 are joined through friction-stir lap welding that performs friction stirring at the overlapped portion 21.

The third metal member 13 is a lid provided on the back surface 15 of the first metal member 11 and seals the opening of the recess portion 18. The third metal member 13 is not particularly limited as long as it is a metal capable of friction stirring, but in the present embodiment, it is formed from a metal equivalent to the first metal member 11. Note that the third metal member 13 can be formed from an aluminum alloy equivalent to the second metal member 12 with lower hardness than the first metal member 11. The third metal member 13 has a rectangular plate shape in a plan view and possesses an outer peripheral shape (shape placeable on the peripheral wall step portion 20) substantially equivalent to the inner peripheral shape of the step side face 20b. The third metal member 13 is placed on the peripheral wall step portion 20. As a result, a butted portion 22 is formed between the step side face 20b and the outer peripheral surface of the third metal member 13 (see FIGS. 6A and 6B and 12), and an overlapped portion 23 is formed between the step bottom face 20a and the lower surface of the peripheral edge of the third metal member 13. By inserting a stirring pin 51 of the rotary tool 50 from the side of the third metal member 13, the first metal member 11 and the third metal member 13 are joined through lap plus butt friction-stir welding that performs friction stirring at the butted portion 22 and the overlapped portion 23.

Figure 3:
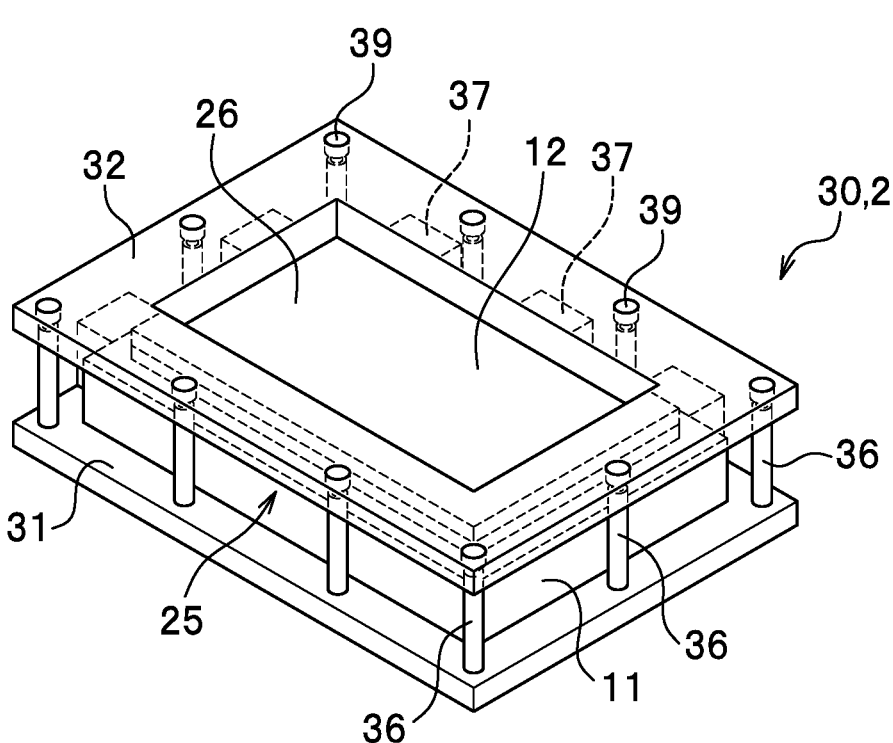
FIG. 3 is a perspective view showing a composite body and a fixing tool according to the embodiment of the present invention.

Next, an explanation will be given regarding the joining device according to the present embodiment. As shown in FIG. 3, the joining device 2 according to the present embodiment is a device that uses a rotary tool 50 to perform friction stirring on a composite body 25 having a first surface 26 and a second surface 27 that is different from the first surface 26, wherein in the composite body 25, metal members (first metal member 11, second metal member 12, and third metal member 13) are combined together in a joined arrangement. The joining device 2 includes a fixing tool 30, a rotary tool 50, and a rotary mechanism 60. In the present specification, the second surface 27 that is different from the first surface 26 generally has a positional relationship where the angle formed by the first surface 26 and the second surface 27 is 90° or more, and particularly has a positional relationship where the angle formed by the first surface 26 and the second surface 27 is 180°, that is, the first surface 26 and the second surface 27 are located upside-down and having an inverted relationship with respect to the front and back surfaces of the composite body 25. In other words, the angle of the rotation axis of the rotary tool 50 relative to the composite body 25 changes by 90° or more between the angle in the case of friction stirring on the first surface 26 and the angle in the case of friction stirring on the second surface 27, particularly by 180°, that is, in the case of an inverted relationship.

The joining device 2 is equipped on a friction stirring device (not shown) and operates. The friction stirring device of the present embodiment can rotate the rotary tool 50 and control its position by moving it in three-axis directions: two-axis linear directions (XY) perpendicular to the rotation axis of the rotary tool 50, and one-axis linear direction (Z) in the direction of the rotation axis of the rotary tool 50. In addition, in the friction stirring device of the present embodiment, the tilt angle of the rotation axis of the rotary tool 50 is not controlled to change, but the tilt angle of the rotation axis of the rotary tool 50 is fixed. Furthermore, the friction stirring device of the present embodiment includes a rotary mechanism 60 to be described later. In other words, the friction stirring device of the present embodiment is configured as a four-axis machining center, which adds one rotation axis of the composite body 25 as a joining target to the three orthogonal axes, XYZ, of the rotary tool 50 in a three-axis machining center.

Figure 4:
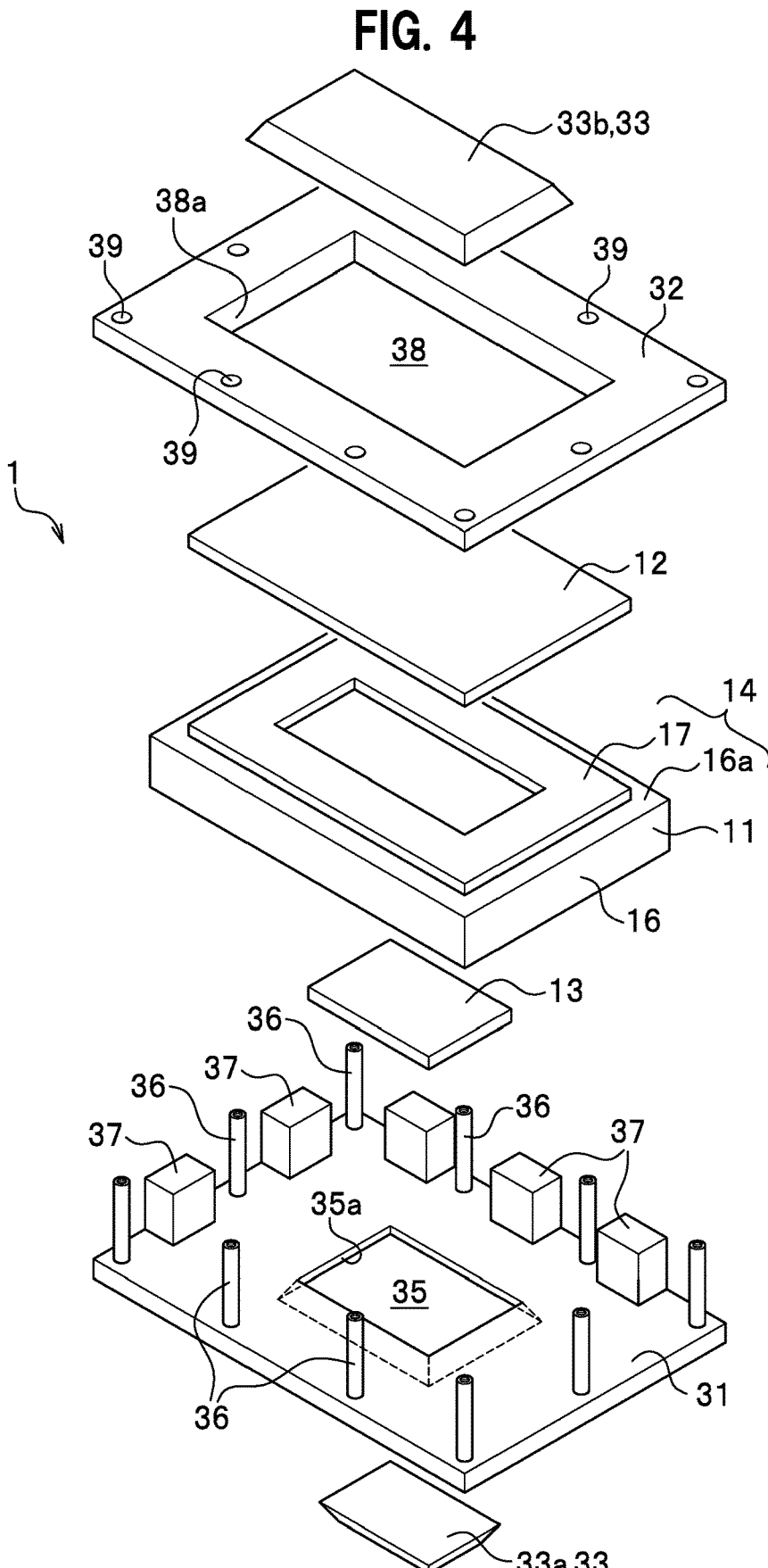
FIG. 4 is an exploded perspective view showing the composite body and the fixing tool according to the embodiment of the present invention.
Figure 5:
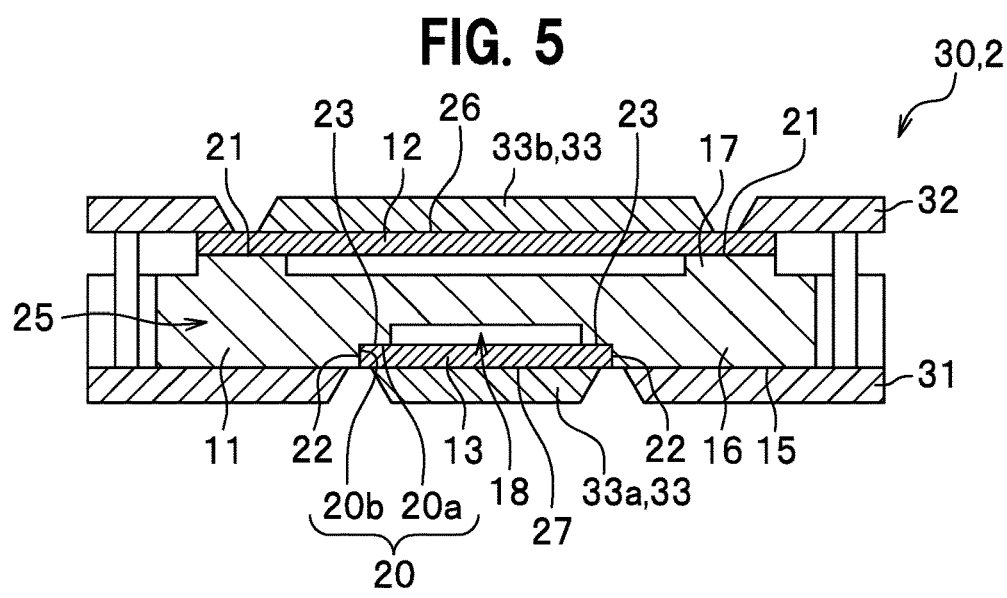
FIG. 5 is a cross-sectional view showing a state where metal members are fixed together by the fixing tool according to the embodiment of the present invention.

As shown in FIGS. 3 to 5, the fixing tool 30 is a means for fixing the composite body 25 in a state where the first metal member 11, the second metal member 12, and the third metal member 13 are combined together in a joined arrangement, by sandwiching it between the first surface 26 on the side of the front surface 14 and the second surface 27 on the side of the back surface 15. The composite body 25 is in a state where the second metal member 12 is placed on the front surface 14 of the first metal member 11, and the third metal member 13 is placed on the back surface 15 of the first metal member 11, but friction stir welding has not been completed to form a joined body 1. Note that in some processes, the composite body 25 may also be a state where the second metal member 12 is simply placed on the front surface 14 of the first metal member 11, or the third metal member 13 is simply placed on the back surface 15 of the first metal member 11.

Figure 8A:
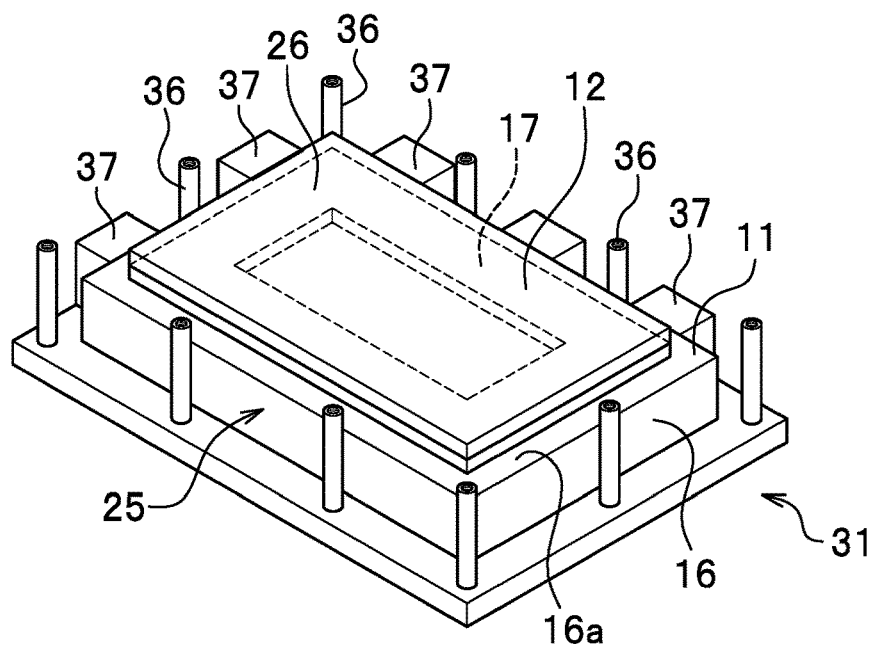
FIG. 8A is a drawing for explaining the arrangement step of the method for manufacturing a joined body according to an embodiment of the present invention, showing a perspective view of a state where a second metal member is placed on the first metal member.
Figure 8B:
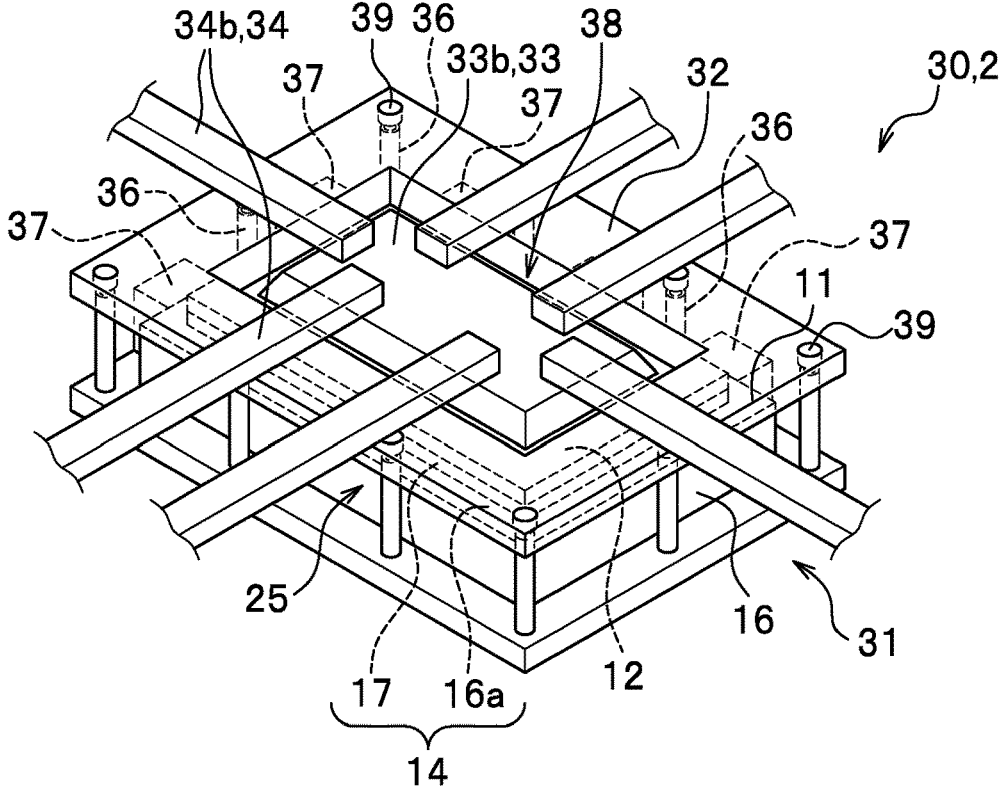
FIG. 8B is a drawing for explaining a fixing step, showing a perspective view of a state where an upper jig and an upper pressing member are placed and held by a pressing arm.
Figure 11A:
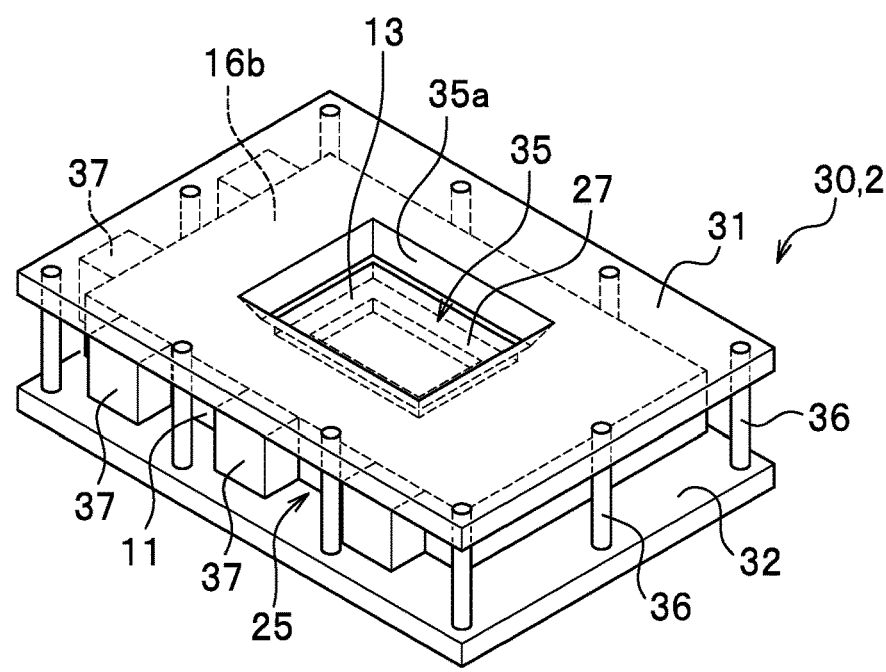
FIG. 11A is a perspective view for explaining the arrangement step following a rotating step in the method for manufacturing a joined body according to an embodiment of the present invention, showing a state where a third metal member is placed on the first metal member.
Figure 11B:
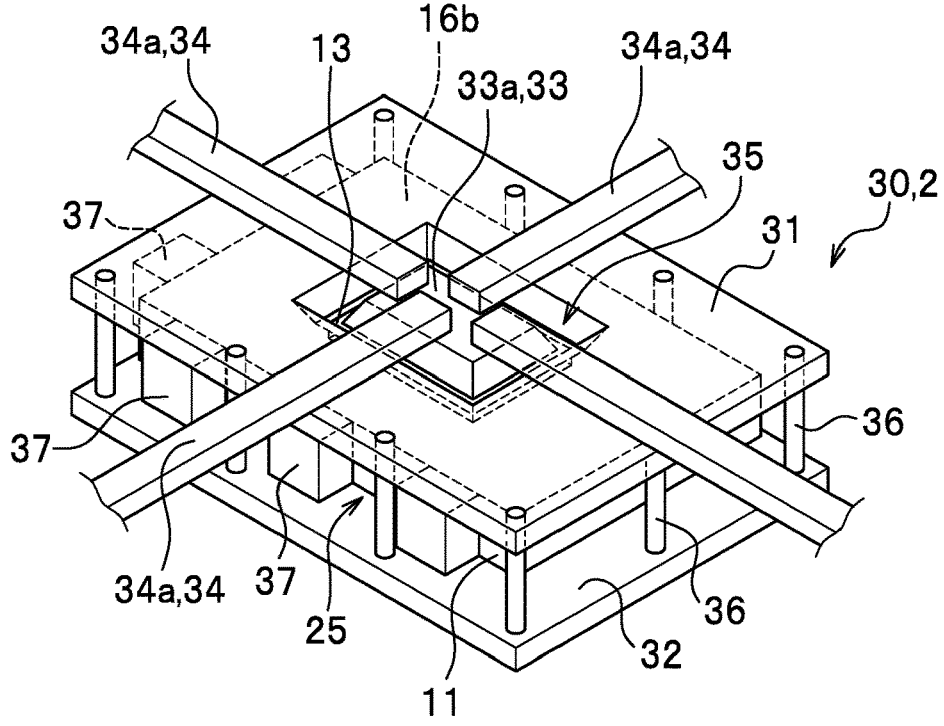
FIG. 11B is a perspective view for explaining the fixing step following the rotating step, showing a state where a lower pressing member is placed and held by the pressing arm.

The fixing tool 30 includes a lower jig 31, an upper jig 32, upper and lower pressing members 33, and upper and lower pressing arms 34 (see to FIG. 8B and FIG. 11B).

The lower jig 31 is a site that holds the composite body 25 from below. The lower jig 31 has a plate shape with a slightly larger outer peripheral shape (rectangular shape in the present embodiment) along the outer peripheral shape of the composite body 25. Note that as long as the lower jig 31 has a shape that can at least hold and fix the peripheral area along the friction stirring site, which is the area where friction stir welding is performed, it may have a shape that is smaller than the outer peripheral shape of the composite body 25. In this case, it is permissible for a part of the composite body 25 to have a shape that protrudes beyond the lower jig 31. The lower jig 31 has an opening 35 formed therein. The opening 35 is for inserting the stirring pin 51 of the rotary tool 50, and in the present embodiment, it has a rectangular shape along the outer peripheral shape of the third metal member 13. The opening side surface 35a of the inner periphery of the opening 35 is tilted as it moves away from the placement surface of the third metal member 13, diverging from the center of the opening 35. The tilt angle of the opening side surface 35a may be appropriately set within a range that does not come into contact with the stirring pin 51 of the rotary tool 50, but in the present embodiment, it is substantially the same as the tilt angle of the outer peripheral surface of the stirring pin 51 of the rotary tool 50.

On the outer peripheral edge of the lower jig 31, pillar members 36 for connecting with the upper jig 32 are provided. Multiple pillar members 36 are provided and arranged along the outer peripheral edge of the lower jig 31 at predetermined pitches. The pillar members 36 are, for example, threaded members, and female threads are formed on their inner upper ends. The pillar members 36 are arranged at positions that do not interfere with the composite body 25. Also, on the outer peripheral edge of the lower jig 31, positioning members 37 for regulating the placement position of the composite body 25 are provided. The positioning members 37 are arranged on at least two intersecting sides of the outer peripheral edge of the lower jig 31. The positioning members 37 have, for example, a rectangular prism shape, and their sides come into contact with the composite body 25, thereby positioning the composite body 25.

The opening 35 receives insertion of the lower pressing member 33a. Note that when distinguishing between upper and lower pressing members 33, the lower pressing member is referred to as "33a," and the upper pressing member is referred to as "33b." The pressing member 33a is a member for holding the third metal member 13. In a plan view, the pressing member 33a exhibits a rectangular plate shape, with an outer peripheral shape slightly smaller than the outer peripheral shape of the third metal member 13. The lower jig 31 and the lower pressing member 33a are arranged on both sides, with the friction stirring site interposed therebetween. The outer peripheral side surface of the pressing member 33a tilts as it moves away from the surface in contact with the third metal member 13 towards the outer side in the height direction, and towards the center of the pressing member 33a. In other words, the pressing member 33a has a cross-sectional trapezoidal shape that narrows as it moves away from the third metal member 13. The tilt angle of the outer peripheral side surface of the pressing member 33a may be appropriately set within a range that does not come into contact with the stirring pin 51 of the rotary tool 50, but in the present embodiment, it is substantially the same as the tilt angle of the outer peripheral surface of the stirring pin 51 of the rotary tool 50.

As shown in FIG. 11B, the pressing member 33a is pressed by the lower pressing arm 34a. Note that when distinguishing between the upper and lower pressing arms 34, the lower pressing arm is referred to as "34a," and the upper pressing arm is referred to as "34b." The pressing arm 34a is capable of approaching and separating from the pressing member 33a, and by bringing the distal end portion of the pressing arm 34a into proximity with the pressing member 33a and making contact to apply pressure, the pressing member 33a is fixed. Multiple (four in the present embodiment) pressing arms 34a are provided, each arranged to approach and separate from one of the four directions. The number and orientation of the pressing arms 34a are appropriately determined based on the shape and size of the pressing member 33a.

As shown in FIGS. 3 to 5, the upper jig 32 is a site that holds the composite body 25 from above. The upper jig 32 has a plate shape with a slightly larger outer peripheral shape (rectangular shape in the present embodiment, which is the same as the lower jig 31) along the outer peripheral shape of the composite body 25. Note that as long as the upper jig 32 has a shape that can at least hold and fix the peripheral area along the friction stirring site, which is the area where friction stir welding is performed, it may have a shape that is smaller than the outer peripheral shape of the composite body 25. In this case, it is permissible for a part of the composite body 25 to have a shape that protrudes. The upper jig 32 has an opening 38 formed therein. The opening 38 is for inserting the stirring pin 51 of the rotary tool 50, and in the present embodiment, it has a rectangular shape along the outer peripheral shape of the second metal member 12. The peripheral edge of the opening 38 holds the outer portion of the peripheral edge of the second metal member 12 where the rotary tool 50 passes (the peripheral area along the friction stirring site on the first surface 26). The opening side surface 38*a* of the inner periphery of the opening 38 is tilted as it moves away from the placement surface of the second metal member 12, diverging from the center of the opening 38. The tilt angle of the opening side surface 38*a* is substantially the same as the tilt angle of the outer peripheral surface of the stirring pin 51 of the rotary tool 50.

At the outer peripheral edge of the upper jig 32, bolt holes 39 are formed. The bolt holes 39 are formed in positions corresponding to the pillar member 36 of the lower jig 31, and bolts (not shown), which screw with the pillar member 36, are inserted. The bolt holes 39 penetrate through the upper jig 32 vertically, having an inner diameter in the upper part through which the bolt head can be inserted, and the lower end portion has a reduced inner diameter allowing only the bolt shaft portion to be inserted. The bolt inserted through the bolt hole 39 protrudes downward with its shaft portion and screws into the female thread of the pillar member 36, thereby fastening the lower jig 31 and the upper jig 32 together.

The opening 38 receives insertion of the upper pressing member 33*b*. The pressing member 33*b* is a member for holding the second metal member 12. In a plan view, the pressing member 33*b* exhibits a rectangular plate shape, with an outer peripheral shape slightly smaller than the outer peripheral shape of the second metal member 12, and is larger than the pressing member 33*a*. The upper jig 32 and the upper pressing member 33*b* are arranged on both sides, with the friction stirring site interposed therebetween. The outer peripheral side surface of the pressing member 33*b* tilts as it moves away from the placement surface of the second metal member 12, and towards the center of the pressing member 33*b*. In other words, the pressing member 33*b* has a cross-sectional trapezoidal shape that narrows as it moves away from the second metal member 12. The tilt angle of the outer peripheral side surface of the pressing member 33*b* may be appropriately set within a range that does not come into contact with the stirring pin 51 of the rotary tool 50, but in the present embodiment, it is substantially the same as the tilt angle of the outer peripheral surface of the stirring pin 51 of the rotary tool 50.

As shown in FIG. 8B, the pressing member 33*b* is pressed by the lower pressing arm 34*b*. The pressing arm 34*b* is capable of approaching and separating from the pressing member 33*a*, and by bringing the distal end portion of the pressing arm 34*b* into proximity with the pressing member 33*b* and making contact to apply pressure, the pressing member 33*b* is fixed. Multiple (six in the present embodiment) pressing arms 34*b* are provided, with such a configuration that two approach and separate from each longer side of the pressing member 33*b*, and one from the shorter side thereof. The number and orientation of the pressing arms 34*b* are appropriately determined based on the shape and size of the pressing member 33*a*.

Figure 9:
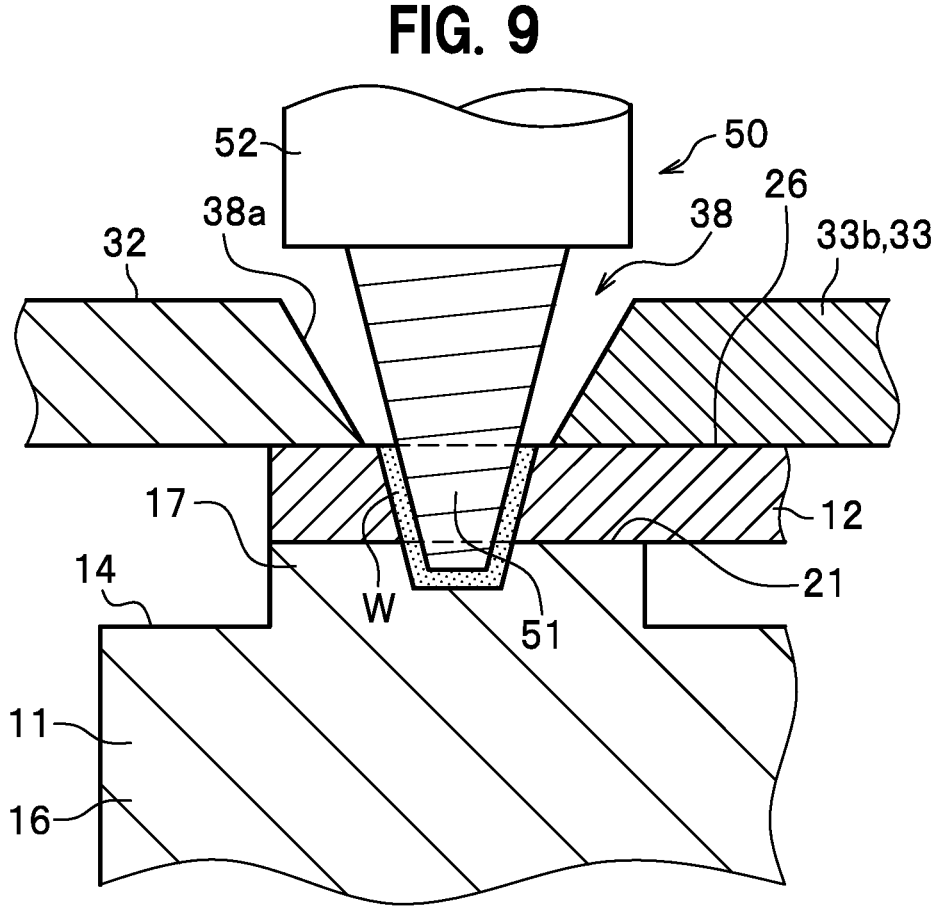
FIG. 9 is a cross-sectional view for explaining a first friction stirring step in the method for manufacturing a joined body according to an embodiment of the present invention, showing a state where a rotary tool is inserted into the first metal member and the second metal member.
Figure 12:
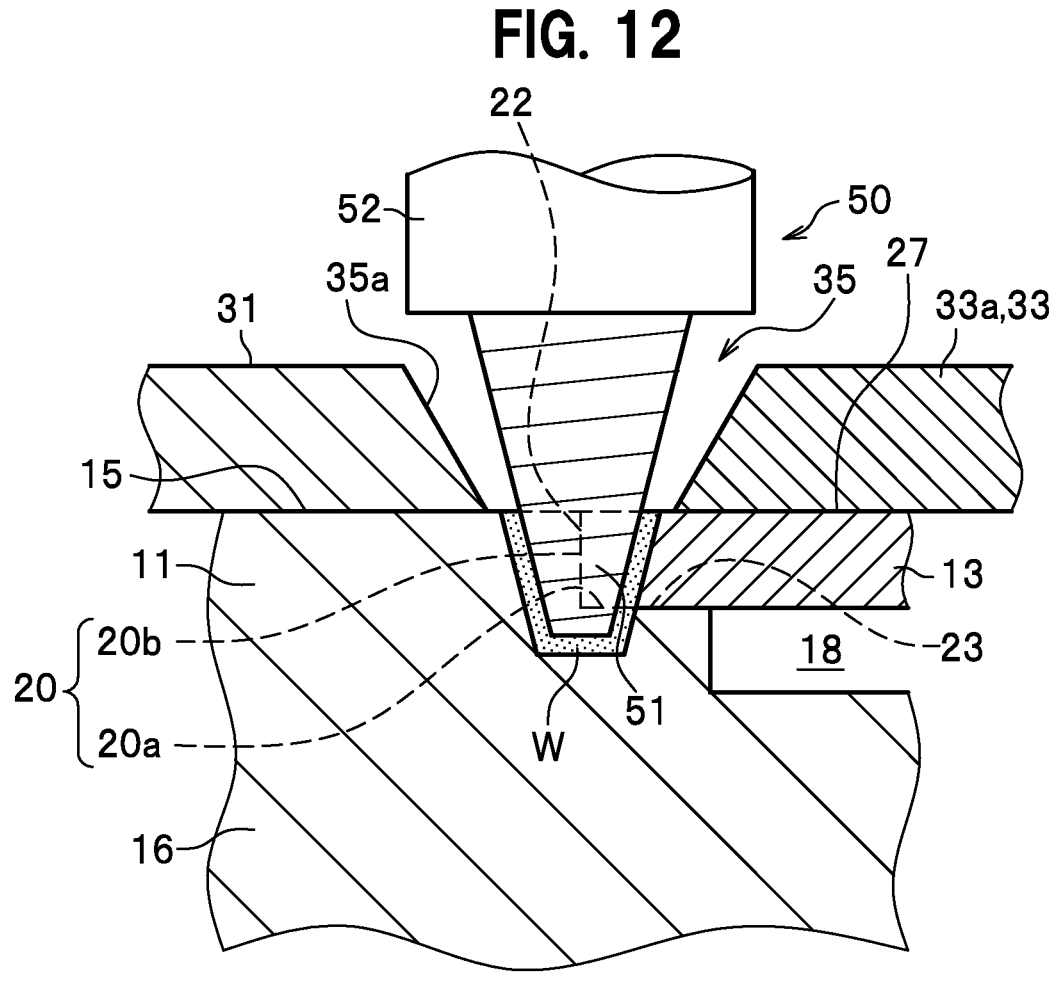
FIG. 12 is a cross-sectional view for explaining a second friction stirring step in the method for manufacturing a joined body according to an embodiment of the present invention, showing a state where the rotary tool is inserted into the first metal member and the third metal member.

As shown in FIGS. 9 and 12, the rotary tool 50 includes a stirring pin 51 and a shoulder portion 52. The rotary tool 50 is formed, for example, from tool steel. In this present embodiment, only the stirring pin 51 is brought into contact with the composite body 25, and the proximal end side of the stirring pin 51 is exposed, enabling friction stir welding. Furthermore, friction stir welding is performed without bringing the shoulder portion 52 into contact with the composite body 25.

The shoulder portion 52 is a site that is connected to the rotation axis of the friction stirring device (not shown). The shoulder portion 52 exhibits a cylindrical shape, and a threaded hole (not shown) where a bolt is fastened is formed.

The stirring pin 51 hangs down from the shoulder portion 52 and is coaxial with the shoulder portion 52. As the stirring pin 51 is away from the shoulder portion 52, it tapers to a point. A helical groove is engraved on the outer peripheral surface of the stirring pin 51. In the present embodiment, to rotate the rotary tool 50 in the clockwise direction, the helical groove is formed to rotate in the counterclockwise direction as it goes from the proximal end to the distal end. In other words, the helical groove is formed in the counterclockwise direction when traced from the proximal end to the distal end, as viewed from above.

In addition, when rotating the rotary tool 50 in the counterclockwise direction, it is preferable to form the helical groove in the clockwise direction as it goes from the proximal end to the distal end. In other words, in this case, the helical groove is formed in the clockwise direction when traced from the proximal end to the distal end, as viewed from above. By configuring the helical groove in this manner, the metal that undergoes plastic flow during friction stirring is guided by the helical groove to the distal end side of the stirring pin 51. As a result, it is possible to reduce the amount of metal overflowing outside the joint metal member.

The rotary mechanism 60 serves to rotate the composite body 25 in a state fixed to the fixing tool 30. The rotary mechanism 60 causes rotation of the composite body 25 such that the first surface 26 or the second surface 27 of the composite body 25 is in a positional relationship facing the rotary tool 50, where friction stir welding is performed. Furthermore, the rotary mechanism 60 brings the composite body 25 to a stop at a position where the first surface 26 or the second surface 27 faces the rotary tool 50. In the present specification, a positional relationship facing the rotary tool 50 refers to a positional relationship in which the angle formed between the rotation axis of the rotary tool 50 and the site for performing friction stir welding of the composite body 25 is equal to the insertion angle of the rotary tool 50 into the site for performing friction stir welding of the composite body 25. By arranging the rotary tool 50 and the composite body 25 in such a positional relationship, it becomes possible to perform friction stir welding at the desired position by moving the rotary tool 50 in the three-axis directions: the two-axis linear directions (XY) perpendicular to the rotation axis of the rotary tool 50, and the one-axis linear direction (Z) in the direction of the rotation axis of the rotary tool 50. Furthermore, in this situation, friction stir welding can be performed without changing the tilt angle of the rotation axis of the rotary tool 50.

Figure 6A:
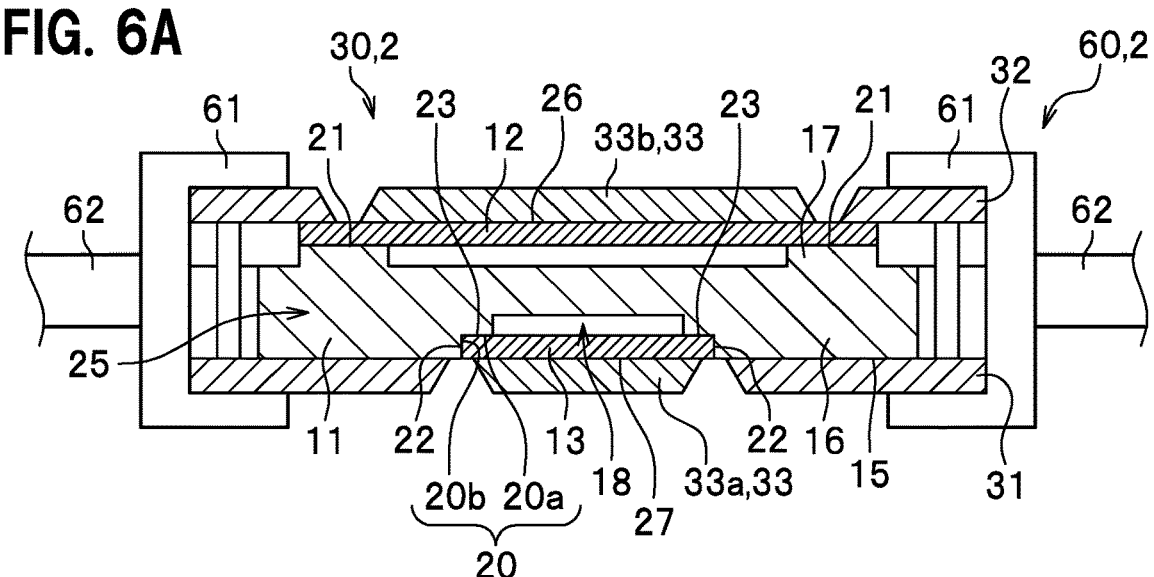
FIG. 6A is a cross-sectional view showing a state where the metal members are fixed together by the fixing tool according to the embodiment of the present invention, showing a state prior to rotation, with the metal members placed on a rotary mechanism.
Figure 6B:
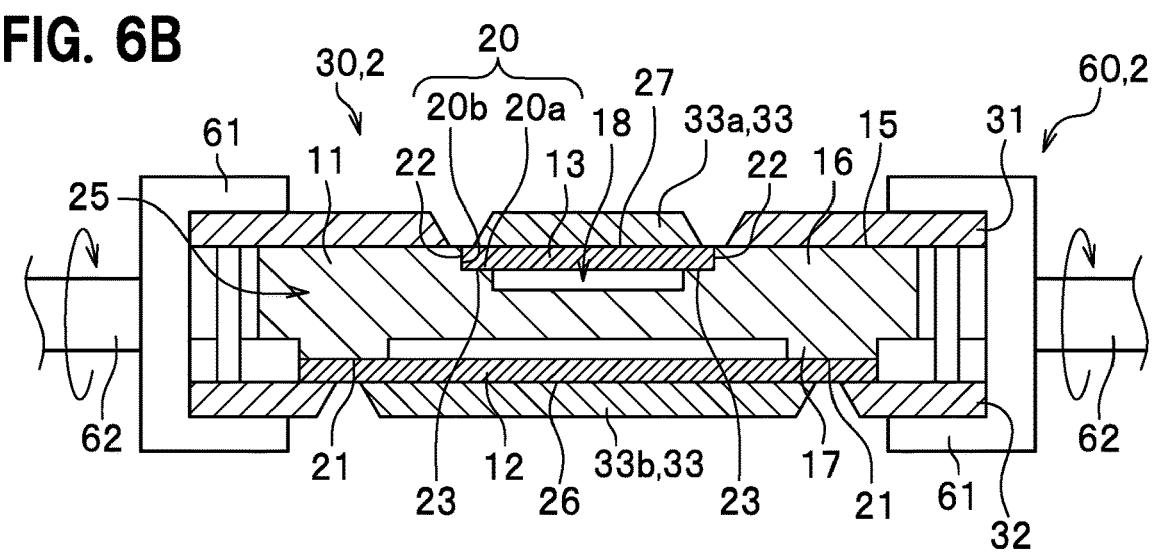
FIG. 6B is a cross-sectional view showing a state after rotation.

As shown in FIGS. 6A and 6B, the rotary mechanism 60 includes a pair of gripping portions 61, a rotation axis 62, and a rotation driver (not shown). The gripping portions 61 are configured with clamps that clamp the composite body 25 from both sides together with the fixing tool 30. The clamps are movable between the clamp state to clamp the composite body 25, and the release state to release the composite body 25. The rotation axis 62 is connected to each gripping portion 61. The pair of rotational axes 62, 62 are coaxially arranged and are rotated by a rotation driver not shown in the figures.

Next, the method for manufacturing the joined body 1 according to the present embodiment will be described. The method for manufacturing the joined body 1 according to the present embodiment performs a preparation step, an arrangement step, a fixing step, a first friction stirring step, a rotating step, a second friction stirring step, and a fixing tool removal step.

The preparation step is a step for preparing the first metal member 11, the second metal member 12, and the third metal member 13. There are no particular limitations on the method for manufacturing each member, but the first metal member 11, for example, is formed using die casting. The second metal member 12 and the third metal member 13 are formed, for example, through extrusion molding.

Figure 7A:
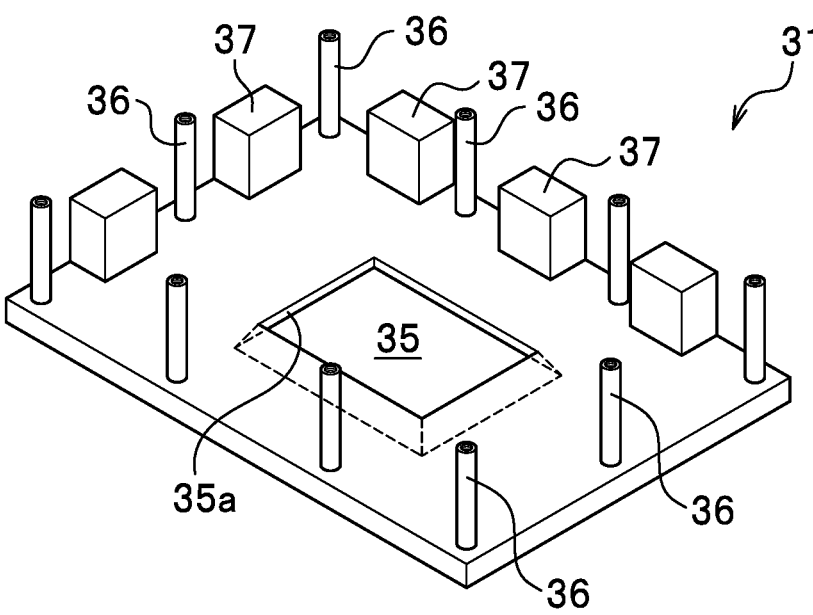
FIG. 7A is a drawing for explaining an arrangement step of the method for manufacturing a joined body according to the embodiment of the present invention, showing a perspective view of a lower jig.
Figure 7B:
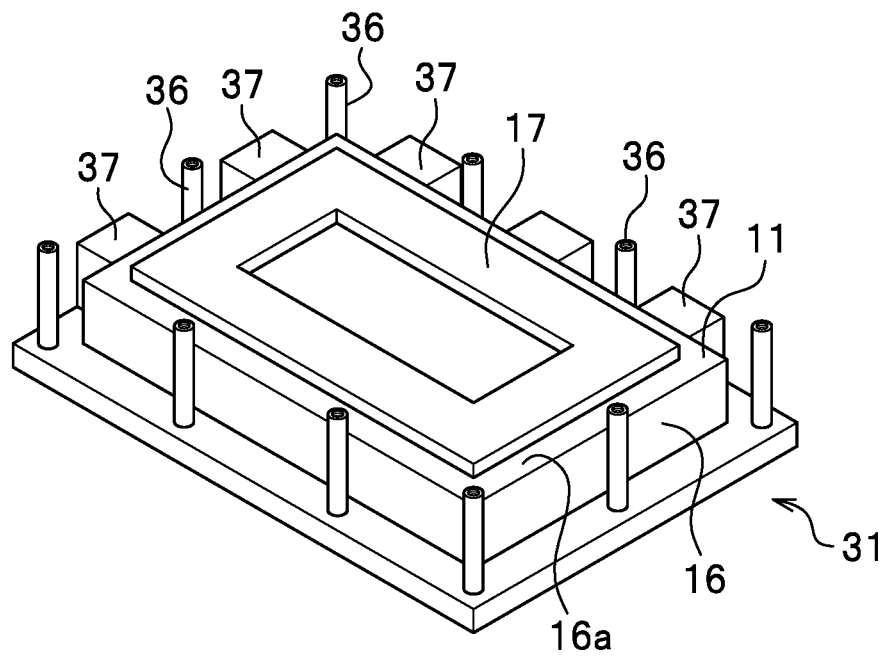
FIG. 7B is a perspective view showing a state where a first metal member is placed on the lower jig.

The arrangement step is a step of forming the composite body 25 by combining the metal members 11, 12, and 13 in an arrangement where they are joined to each other. In the arrangement step of the present embodiment, first, the first metal member 11 is combined with the second metal member 12. The lower jig 31 is placed as shown in FIG. 7A, and then the first metal member 11 is set on the lower jig 31, as shown in FIG. 7B. In the first metal member 11, the front surface 14 faces upwards, and the front surface 14 is set to face the upper rotary tool 50. At this time, the side surface of the first metal member 11 is brought into contact with the side surfaces of the positioning members 37 to place the first metal member 11 at a predetermined position. Then, as shown in FIG. 8A, the second metal member 12 is set on the frame portion 17 of the first metal member 11. Here, an overlapped portion 21 is formed between the upper surface of the frame portion 17 and the lower surface of the second metal member 12 (see FIG. 9). The third metal member 13 is combined to the first metal member 11 in a subsequent step. In the present embodiment, the first metal member 11 and the second metal member 12 are set such that the angle formed by the rotation axis of the rotary tool 50 and the first metal member 11 and the second metal member 12 having the butted portion 21 formed thereon is equal to the insertion angle of the rotary tool 50 into the overlapped portion 21. In this way, the first metal member 11 and the second metal member 12 are arranged such that the first surface 26 that undergoes friction stirring is in a positional relationship to face the rotary tool 50 in an opposing position.

The fixing step is a step of fixing the composite body 25 by combining the metal members 11 and 12 in an arrangement state where they are joined to each other. In the fixing step, as shown in FIG. 8B, the upper jig 32 is placed on top of the composite body 25. By inserting bolts into the bolt holes 39 of the upper jig 32 and screwing them into the pillar members 36 of the lower jig 31, the upper jig 32 is fixed to the lower jig 31, and the composite body 25 is clamped and fixed between the upper jig 32 and the lower jig 31. At this time, the peripheral edge of the second metal member 12 (the peripheral area along the friction stirring site on the front surface 14 on the first surface 26 side) is held by the upper jig 32, and the second surface 27 of the composite body 25 is held by the lower jig 31. Thus, in the fixing step, on the first surface 26, the fixing tool 30 fixes the composite body 25 by holding the peripheral area along the friction stirring site on the first surface 26 using the upper jig 32. Furthermore, on the second surface 27, the fixing tool 30 fixes the composite body 25 by holding the site opposite to the peripheral area along the friction stirring site on the first surface 26 using the lower jig 31. Moreover, in the fixing step, the fixing tool 30 fixes the composite body 25 by sandwiching it between the peripheral area along the friction stirring site on the first surface 26 and the site of the composite body 25 opposite to the first surface 26 using the upper jig 32 and the lower jig 31.

Next, the pressing member 33b is inserted into the opening 38 of the upper jig 32 and placed on the second metal member 12. Then, each pressing arm 34b is moved onto the pressing member 33b to hold the pressing member 33b. As a result, a substantially entire upper end surface of the first surface 26 of the composite body 25 except the pass-through area of the rotary tool 50, is held down by the upper jig 32 and the pressing member 33b. In this manner, during the fixing step, the fixing tool 30 fixes the composite body 25 by holding the entire first surface 26 except the friction stirring site on the first surface 26, by means of the upper jig 32 and the pressing member 33b. Moreover, in the fixing step, the fixing tool 30 fixes the composite body 25 by sandwiching it between the entire first surface 26 except the friction stirring site on the first surface 26 and the site of the composite body 25 opposite to the first surface 26 using the upper jig 32 and the pressing member 33b, as well as the lower jig 31.

The first friction stirring step is a step for performing friction stir welding by inserting the stirring pin 51 of the rotary tool 50 through the first surface 26 on the front surface 14 side into the fixed composite body 25. As shown in FIG. 9, the first friction stirring step includes performing friction stirring of the overlapped portion 21 by inserting the stirring pin 51 from the front surface side of the second metal member 12. In the present embodiment, the travel route of the rotary tool along the overlapped portion 21 at the outer peripheral edge of the second metal member 12 is set to a rectangular shape in a plan view.

Figure 10A:
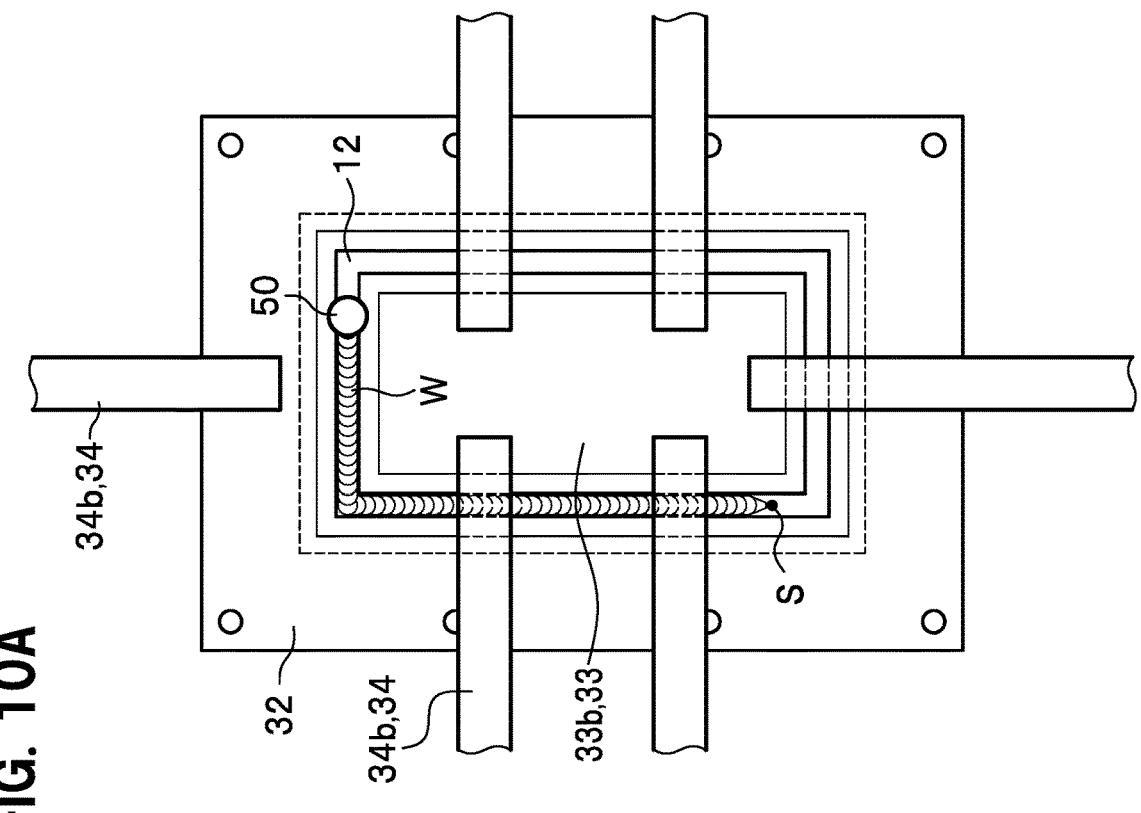
FIG. 10A is a plan view for explaining the first friction stirring step in the method for manufacturing a joined body according to an embodiment of the present invention, showing a state during friction stir welding.
Figure 10B:
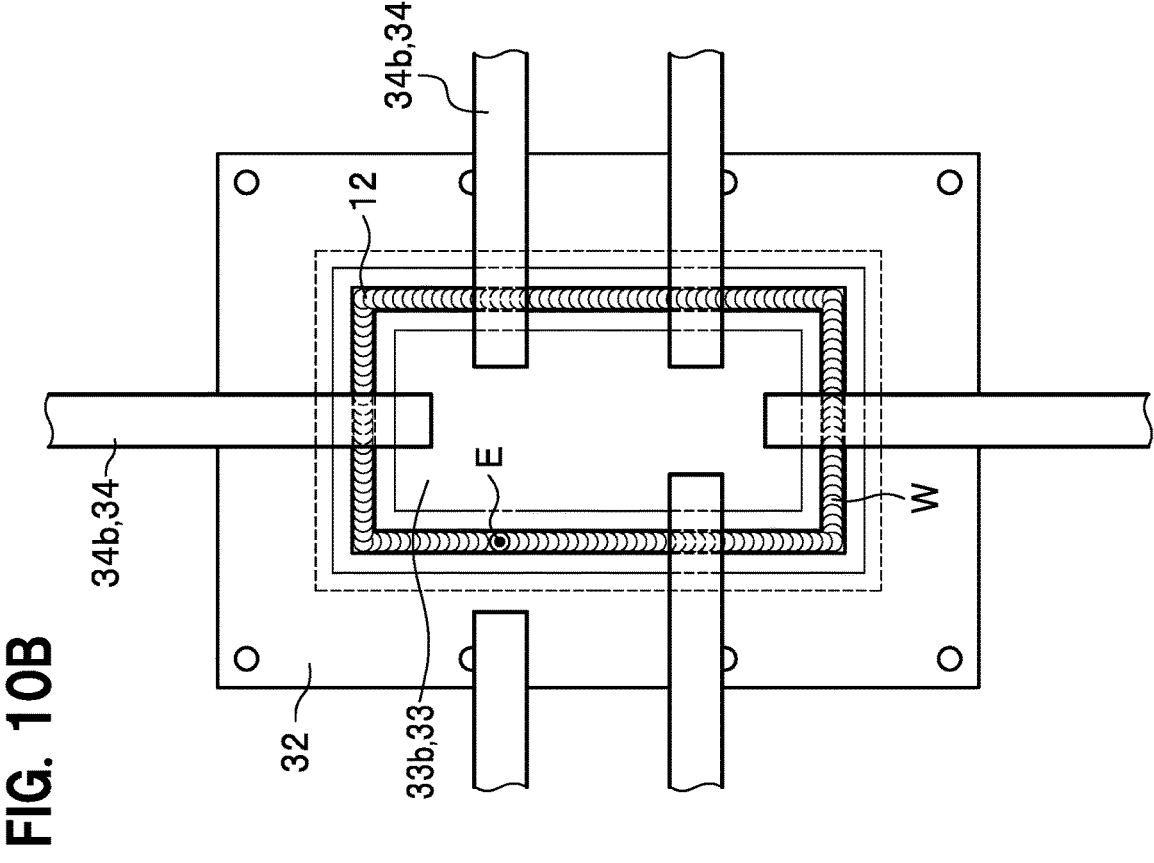
FIG. 10B is a plan view showing the state after friction stir welding.

As shown in FIG. 10A, in the present embodiment, the stirring pin 51 of the rotary tool 50 is inserted from the starting position S set on the travel route, and is moved clockwise along the travel route. As shown in FIG. 10B, once the rotary tool 50 has completed one revolution around the second metal member 12, the start and end of the plasticized region are overlapped by a certain length, and then the stirring pin 51 is withdrawn from the finish position E. During the insertion of the stirring pin 51, the stirring pin 51 is gradually moved downward along the travel route from the starting position S. In other words, the rotary tool 50 is not kept stationary in one place, allowing the insertion of the stirring pin 51. On the other hand, during the withdrawal of the stirring pin 51, the stirring pin 51 is gradually moved upward along the travel route. In other words, the rotary tool 50 is not kept stationary in one place, allowing the withdrawal of the stirring pin 51. The pressing arm 34b that spans the passage during the movement of the rotary tool 50 is temporarily separated from the pressing member 33b to open the passage. During this process, the pressing member 33b is fixed by other pressing arms 34b.

The rotary tool 50 moves along the travel route while rotating clockwise. Since the helical groove of the stirring pin 51 is formed in the counterclockwise direction as it goes from the proximal end to the distal end, the metal that undergoes plastic flow during friction stirring is guided by the helical groove to the distal end side of the stirring pin 51. As a result, it is possible to reduce the amount of metal overflowing outside the joint metal member.

As shown in FIG. 9, the stirring pin 51 is pushed into the second metal member 12 and the first metal member 11 to reach a "predetermined depth." The predetermined depth refers to the depth where the distal end surface of the stirring pin 51 penetrates the second metal member 12 and slightly contacts the frame portion 17 of the first metal member 11. Note that as long as the plasticized region W reaches the frame portion 17, it is not necessary for the distal end surface of the stirring pin 51 to be in contact with the upper end of the frame portion 17. Additionally, the predetermined depth is such a depth that the stirring pin 51 does not interfere with the opening side surface 38a of the opening 38 of the upper jig 32 or the outer peripheral side surface of the pressing member 33b.

The rotating step is a step of rotating the fixed composite body 25 such that the second surface 27 on the side of the back surface 15 is in a positional relationship to face the rotary tool 50. In the rotating step, as shown in FIGS. 6A and 6B, the composite body 25, clamped between the upper jig 32 and the lower jig 31, is clamped from both sides in the longitudinal direction using gripping portions 61, 61, and is rotated around the rotation axis 62. The rotary mechanism 60 rotates the composite body 25 (see FIG. 6A), faced by the first surface 26 upward, by 180 degrees, so that the second surface 27 faces upward. In the present embodiment, the composite body 25 is rotated so that the rotary tool 50 faces the butted portion 22, and the angle formed between the rotation axis of the rotary tool 50 and the first metal member 11 and the third metal member 13 having the butted portion 22 formed thereon is equal to the insertion angle of the rotary tool 50 into the butted portion 22. Note that the position for clamping with gripping portions 61 is not limited to both sides in the longitudinal direction of the composite body 25, and it can be on both sides in the lateral direction as well, and it is also possible to clamp with only one gripping portion at a single location.

Subsequently, in the remaining steps of the arrangement step, the operation of combining the third metal member 13 to the first metal member 11 is performed. As shown in FIG. 11A, the third metal member 13 is inserted through the opening 35 of the lower jig 31 into the peripheral wall step portion 20 of the recess portion 18 of the first metal member 11. As a result, a butted portion 22 is formed between the step side face 20b and the outer peripheral surface of the third metal member 13, and an overlapped portion 23 is formed between the step bottom face 20a and the lower surface of the peripheral edge of the third metal member 13 (see FIG. 12). Although the first metal member 11 has undergone frictional heating due to friction stirring in the first friction stirring step, it remains undeformed since it is clamped between the upper jig 32 and the lower jig 31. Consequently, the third metal member 13 can be smoothly placed within the recess portion 18.

Subsequently, in the remaining steps of the fixing step, the operation of fixing the third metal member 13 from the side of the back surface 15. As shown in FIG. 11B, the pressing member 33a is inserted into the opening 35 of the lower jig 31 and placed on the third metal member 13. Then, each pressing arm 34a is moved onto the pressing member 33a to hold the pressing member 33a. As a result, a substantially entire surface of the second surface 27 of the composite body 25 except the pass-through area of the rotary tool 50, is held down by the lower jig 31 and the pressing member 33a. In this manner, during the fixing step, the fixing tool 30 fixes the composite body 25 by holding the entire second surface 27 except the friction stirring site of the second surface 27, by means of the lower jig 31 and the pressing member 33a. Moreover, in the fixing step, the fixing tool 30 fixes the composite body 25 by sandwiching it between the entire first surface 26 except the friction stirring site on the first surface 26 and the entire second surface 27 except the friction stirring site of the second surface 27 opposite to the first surface 26 of the composite body 25 using the upper jig 32 and the pressing member 33b, as well as the lower jig 31 and the pressing member 33a.

The second friction stirring step is a step for performing friction stir welding by inserting the stirring pin 51 of the rotary tool 50 through the second surface 27 on the back surface 15 side into the fixed composite body 25. As shown in FIG. 12, the second friction stirring step includes performing friction stirring of the butted portion 22 and the overlapped portion 23 by inserting the stirring pin 51 from the upper surface side of the inverted third metal member 13. In the present embodiment, the travel route of the rotary tool along the opening of the recess portion 18 of the first metal member 11, the third metal member 13, and the butted portion 22 is set to a rectangular shape in a plan view.

In the second friction stirring step, as in the first friction stirring step, the stirring pin 51 of the rotary tool 50 is inserted from the starting position set on the travel route, and is moved clockwise along the travel route. Once the rotary tool 50 has completed one revolution around the third metal member 13, the start and end of the plasticized region are overlapped by a certain length, and then the stirring pin 51 is withdrawn from the finish position. During the insertion of the stirring pin 51, the stirring pin 51 is gradually moved downward along the travel route from the starting position S. On the other hand, during the withdrawal of the stirring pin 51, the stirring pin 51 is gradually moved upward along the travel route. The pressing arm 34a that spans the passage during the movement of the rotary tool 50 is temporarily separated from the pressing member 33a to open the passage. During this process, the pressing member 33a is fixed by other pressing arms 34a.

The rotary tool 50 moves along the travel route while rotating clockwise. Since the helical groove of the stirring pin 51 is formed in the counterclockwise direction as it goes from the proximal end to the distal end, the metal that undergoes plastic flow during friction stirring is guided by the helical groove to the distal end side of the stirring pin 51. As a result, it is possible to reduce the amount of metal overflowing outside the joint metal member.

The stirring pin 51 is pushed into the third metal member 13 and the first metal member 11 to reach a "predetermined depth." The predetermined depth refers to the depth where the distal end surface of the stirring pin 51 passes through all the butted portion 22 and slightly contacts the overlapped portion 23. Note that as long as the plasticized region W reaches the frame portion 17, it is not necessary for the distal end surface of the stirring pin 51 to be in contact with the overlapped portion 23. Additionally, the predetermined depth is such a depth that the stirring pin 51 does not interfere with the opening side surface 35a of the opening 35 of the lower jig 31 or the outer peripheral side surface of the pressing member 33a.

The fixing tool removal step is a step of removing the fixing tool 30 from the joined body 1 after the second friction stirring step has been completed. In the fixing tool removal step, after removing the pressing arms 34a, 34b, and the pressing members 33a, 33b, the upper jig 32 is detached from the lower jig 31, and the joined body 1 is removed from the lower jig 31. Through the aforementioned steps, the manufacture of the joined body 1 is completed.

Next, the operations and effects of the method for manufacturing the joined body 1 and the joining device 2 according to the present embodiment will be described.

By performing friction stir welding on the first surface 26 side of the composite body 25, due to the frictional heat generated by the friction stirring, the first surface 26 side of the composite body 25 contracts, causing compressive stress on the first surface 26 side and tensile stress on the back side of the first surface 26. If the fixation of the composite body 25 is released in this state, the composite body 25 warps concavely toward the first surface 26 due to the compressive stress and tensile stresses, causing deformation such that the composite body 25 bends convexly toward the back side of the first surface 26. Additionally, burrs are generated during friction stir welding, and deformation can occur due to thinning of the composite body 25. In contrast, in the method for manufacturing the joined body 1 and the joining device 2 of the present embodiment, after the first friction stirring step of the first surface 26 of the composite body 25 is performed, the composite body 25 is kept in a fixed state and rotated to perform the second friction stirring step of the second surface 27. This prevents deformation of the composite body 25 due to the release of thermal stress resulting from the frictional heat generated by the first friction stirring step. It is also possible to prevent deformation caused by thinning of the composite body 25. Thus, it is possible to suppress the effects of deformation in the composite body by a first friction stirring step when performing a second friction stirring step on a second surface 27 subsequent to the first friction stirring step on a first surface 26.

In the second friction stirring step, since the first metal member 11 and the third metal member 13 are combined without deformation, this allows friction stir welding to the second surface 27 while the deformation of the composite body 25 is suppressed, eliminating the need for adjusting the insertion depth and insertion position of the stirring pin 51. Furthermore, since there is no need for corrective measures to counter deformation, both labor and time are reduced. This enhances productivity and enables efficient manufacturing of the joined body 1.

In the present embodiment, in the arrangement step, the first metal member 11 and the second metal member 12 are arranged such that the first surface 26 is in a positional relationship to face the rotary tool 50. More specifically, the first metal member 11 and the second metal member 12 are arranged such that the angle formed by the rotation axis of the rotary tool 50 and the first metal member 11 and the second metal member 12 having the butted portion 21 formed thereon is equal to the insertion angle of the rotary tool 50 into the overlapped portion 21. This allows friction stir welding to be conducted without altering the tilt angle of the rotation axis of the rotary tool 50, enabling smooth progression to the first friction stirring step.

In addition, in the fixing step, the fixing tool 30 fixes the composite body 25 by holding the peripheral edge of the second metal member 12 (peripheral area along the friction stirring site on the first surface 26) by the upper jig 32. As a result, it becomes possible to fix the vicinity of the part prone to deformation due to the friction stirring of the first metal member 11 and the second metal member 12. Consequently, deformation occurring around the friction stirring site and its vicinity can be more easily suppressed.

Additionally, in the fixing step, the fixing tool 30 fixes the composite body 25 by holding the entire first surface 26 except the friction stirring site on the first surface 26 of the composite body 25, by holding the second metal member 12 by means of the upper jig 32 and the pressing member 33b. This ensures the holding of substantially the entire first surface 26, including the peripheral area along the friction stirring site but excluding the friction stirring site. Consequently, it becomes easier to suppress deformation throughout the composite body 25 while fixing the composite body 25 and simultaneously avoiding obstruction of the friction stir welding on the first surface 26 due to interference between the fixing tool 30 and the rotary tool 50.

Furthermore, in the fixing step, the fixing tool 30 not only holds the second metal member 12 but also holds the first metal member 11 with the lower jig 31. In this way, in the fixing step, the fixing tool 30 fixes the composite body 25 by sandwiching it between the first surface 26 of the composite body 25 and a site (second surface 27) on the opposite side of the first surface 26. As a result, the pressing force exerted by the inserted stirring pin 51 from the first surface 26 can be supported from a site on the opposite side of the first surface 26. Consequently, deformation occurring around the friction stirring site and its vicinity can be more easily suppressed. Moreover, the composite body can be rotated while being fixed by sandwiching it between the first surface 26 and the second surface 27 of the composite body 25. Therefore, for example, the handling performance during the rotation of the composite body becomes superior compared to the case of arranging the site of the composite body 25 opposite to the first surface 26 towards a stationary stage and fixing the composite body 25 to the stage.

In the fixing step, the fixing tool 30 holds the second metal member 12 with the upper jig 32 and the upper pressing member 33b, and also holds the first metal member 11 and the third metal member 13 with the lower jig 31 and the lower pressing member 33a. In this manner, in the fixing step, the fixing tool 30 fixes the composite body 25 by sandwiching it between the entire first surface 26 except the friction stirring site on the first surface 26 of the composite body 25 and the entire second surface 27 except the friction stirring site of the second surface 27 opposite to the first surface 26 of the composite body 25. This ensures the holding of substantially the entire first surface 26 and second surface 27 each, including the peripheral area along the friction stirring site but excluding the friction stirring site. Consequently, it becomes easier to suppress deformation throughout the composite body 25 while fixing the composite body 25 and simultaneously avoiding obstruction of the friction stir welding on the first surface 26 and second surface 27 each due to interference between the fixing tool 30 and the rotary tool 50. In addition, the pressing force exerted by the inserted stirring pin 51 from the first surface 26 can be supported from a site on the opposite side of the first surface 26. Consequently, deformation occurring around the friction stirring site and its vicinity becomes more easily suppressed. Moreover, the composite body can be rotated while being fixed by sandwiching it between the first surface 26 and the second surface 27 of the composite body 25. Therefore, the handling performance during the rotation of the composite body 25 becomes superior.

According to the joining device 2 of the present embodiment, after performing the first friction stirring step on the first surface 26 of the composite body 25, it is possible to rotate the composite body 25 while maintaining the fixed state of the composite body 25. Additionally, during the second friction stirring, the joining cycle can be shortened since there is no need to reset the rotary tool 50.

Here, as a processing apparatus, a 5-axis machining center is known. For example, a machining center including two additional axes for rotating the rotary tool in addition to the orthogonal 3 axes, XYZ, of the rotary tool is known. Alternatively, a machining center including two additional axes for rotating a stage on which the joining target is mounted, in addition to the orthogonal 3 axes, XYZ, of the rotary tool is known. By using such a 5-axis machining center, machining on the second surface 27, different from the first surface 26 of the target object, can be performed in addition to the first surface 26. However, the aforementioned 5-axis machining centers are mainly used for cutting applications of target objects and are unsuitable for applications that involve significant pressing forces during joining, such as friction stir welding. Additionally, 5-axis machining centers come with the issues of complex condition settings, control programs, and high introduction costs. In contrast, for applications such as friction stir welding, a 3-axis machining center with three controllable axes, namely the orthogonal XYZ axes of a rotary tool, is used. This machining center is equipped with a stage capable of supporting the pressing force of friction stir welding. In such a machining center, after performing friction stirring on the first surface 26 of the target object fixed to the stage, when attempting to perform friction stirring on a second surface 27 different from the first surface 26, it is necessary to release the fixation and then arrange and fix the target object again. The method for manufacturing the joined body 1 and the joining device 2 according to the present embodiment can be achieved by adding a rotary mechanism 60 to a 3-axis machining center, rotating the composite body 25, supporting pressing force on a stage, and performing friction stirring. This enables achieving the operations and effects of the present invention, which involve friction stir welding the second surface 27, different from the first surface 26, of the composite body 25, while avoiding the complication of condition settings, control programs, and the increase in introduction costs, and suppressing the deformation of the composite body 25, all while maintaining the fixed state of the composite body 25.

One embodiment of the present invention has been described above, but it is possible to make appropriate design changes without departing from the gist of the present invention.

In the aforementioned embodiment, an example has been given where the first surface 26 is on the front surface 14 side, and the second surface 27 is on the back surface 15 side, and the composite body 25 is rotated by 180 degrees, but the present invention is not limited to this specific embodiment. The configuration may be such that the first surface 26 and the second surface 27 are not parallel to each other, but they are tilted, intersecting surfaces. For example, the composite body may have a rectangular prism shape with the first surface 26 and the second surface 27 for friction stir welding on adjacent sides. In this case, after performing friction stir welding on the first surface 26, the composite body is rotated by 90 degrees to position the second surface 27 in a positional relationship to face the rotary tool 50, thereby performing friction stir welding on the second surface 27.

In addition, in the aforementioned embodiment, the joined body 1 is formed by combining the first metal member 11, the second metal member 12, and the third metal member 13, but the present invention is not limited to this specific embodiment. For example, the composite body can be constructed by combining the first metal member and the second metal member. In this case, after performing friction stir welding from the surface of the first metal member as the first surface, the composite body is rotated and then friction stir welding is performed from the surface of the second metal member as the second surface, thereby manufacturing the joined body while maintaining the fixed state of the composite body. At this time, it is permissible for the plasticized region of the friction stirring from the front surface of the composite body and the distal end portion of the plasticized region of the friction stirring from the back surface of the composite body to intersect. Additionally, it is also possible to combine four or more metal members and perform friction stir welding at three or more points.

In the aforementioned embodiment, an example has been given where the first metal member 11 and the second metal member 12 are arranged such that the first surface is in a positional relationship to face the rotary tool 50, and then they are fixed in a state where the first metal member 11 and the second metal member 12 are combined. The arrangement step and fixing step may be performed at a position where the first surface does not face the rotary tool 50. In this case, after forming a composite body 25 in which the first metal member 11 and the second metal member 12 are combined together in an arrangement relationship to be joined to each other, the composite body 25 is fixed in a state where the first metal member 11 and the second metal member 12 are combined together. Subsequently, the composite body 25 may be moved while being fixed to place the fixed composite body 25 such that the first surface 26 is in a positional relationship to face the rotary tool 50. Thus, after the fixing step, there may be a placing step of placing the fixed composite body 25 such that the first surface 26 is in a positional relationship to face the rotary tool 55.

In the aforementioned embodiment, an example has been given where the fixing tool 30 is includes a lower jig 31 having a pillar member 36 and an upper jig 32 having a bolt hole 39, and the composite body 25 is fixed by fastening the lower jig 31 and the upper jig 32 clamping the composite body 25 using bolts. The fixing of the composite body by the fixing tool 30 is not limited to this specific embodiment as long as it can fix the composite body 25 in a state where the first metal member 11 and the second metal member 12 are combined together, and a known fixer can be used. For example, the fixing tool 30 may be a clamp that can be driven mechanically, hydraulically, electrically, electromagnetically, magnetically, or pneumatically, and is movable between a clamp state where it clamps the composite body 25 and a release state where it releases the composite body. The composite body 25 can be fixed in a clamped state using this clamp. Alternatively, the lower jig 31 and the upper jig 32, which clamp the composite body 25, can be clamped and fixed using the clamp.

In the aforementioned embodiment, with reference to FIGS. 9 and 12, an example has been given where friction stir welding is performed using a rotary tool 50 including a stirring pin 51 and a shoulder portion 52, with only the stirring pin 51 in contact with the composite body 25. The shape and joining manner of the rotary tool are not limited to the aforementioned embodiment and can be appropriately changed. For instance, a rotary tool including a shoulder and a stirring pin hanging down from the shoulder can be used to perform friction stir welding while inserting the stirring pin into the composite body 25, with the shoulder in contact with the surface of the composite body. In this case, according to the shape and joining manner of the rotary tool, the shapes of the lower jig 31, upper jig 32, lower pressing member 33a, upper pressing member 33b, as well as the opening 35 enclosed by the lower jig 31 and the lower pressing member 33a, and the opening 38 enclosed by the upper jig 32 and the upper pressing member 33b, can be appropriately changed.

In the aforementioned embodiment, the friction stirring device to be equipped with the joining device 2 has been described as an example constructed as a 4-axis machining center that, in addition to the 3 axes, XYZ, orthogonal to the rotary tool 50, incorporates 1 additional rotation axis of the composite body 25. The friction stirring device may be a 6-axis machining center that not only includes the 3 axes, XYZ, orthogonal to the rotary tool but also has 2 axes to rotate the rotary tool, and further adds 1 rotation axis of the composite body 25. Furthermore, the friction stirring device can also be a robot with multiple-axis joints (robot arm).

REFERENCE SIGNS LIST 1 joined body
2 joining device 11 first metal member (metal member)
12 second metal member (metal member)
13 third metal member (metal member)
14 front surface of first metal member
15 back surface of first metal member
21 overlapped portion
22 butted portion
23 overlapped portion
25 composite body
26 first surface of composite body
27 second surface of composite body
30 fixing tool
50 rotary tool
51 stirring pin
60 rotary mechanism
61 gripping portion (clamp)

The invention claimed is:

1. A method for manufacturing a joined body using a rotary tool with a stirring pin to perform friction stirring on a composite body having a first surface and a second surface that is different from the first surface, wherein in the composite body, metal members are combined together in a joined arrangement, the method comprising:

an arrangement step of forming the composite body by combining the metal members in the arrangement;

a fixing step of fixing the composite body with a fixing tool in a state where the metal members are combined together;

a first friction stirring step of performing friction stir welding by inserting the stirring pin through the first surface into the composite body that is fixed by the fixing tool;

a rotating step of rotating the composite body and the fixing tool such that the second surface is in a positional relationship to face the rotary tool; and a second friction stirring step of performing friction stir welding by inserting the stirring pin through the second surface into the composite body that is fixed by the fixing tool.

2. The method for manufacturing a joined body according to claim 1, wherein in the arrangement step, the metal members are arranged such that the first surface faces the rotary tool.

3. The method for manufacturing a joined body according to claim 1, further comprising, after the fixing step, a placing step of placing the composite body fixed by the fixing tool such that the first surface is in a positional relationship to face the rotary tool.

4. The method for manufacturing a joined body according to claim 1, wherein the fixing step includes fixing the composite body with the fixing tool by holding a peripheral area along a friction stirring site on the first surface.

5. The method for manufacturing a joined body according to claim 1, wherein the fixing step includes fixing the composite body with the fixing tool by holding the entire first surface except a friction stirring site on the first surface.

6. A method for manufacturing a joined body using a rotary tool with a stirring pin to perform friction stirring on a composite body having a first surface and a second surface that is different from the first surface, wherein in the composite body, metal members are combined together in a joined arrangement, the method comprising:

an arrangement step of forming the composite body by combining the metal members in the arrangement;

a fixing step of fixing the composite body with a fixing tool in a state where the metal members are combined together;

a first friction stirring step of performing friction stir welding by inserting the stirring pin through the first surface into the composite body that is fixed by the fixing tool;

a rotating step of rotating the composite body and the fixing tool such that the second surface is in a positional relationship to face the rotary tool; and a second friction stirring step of performing friction stir welding by inserting the stirring pin through the second surface into the composite body that is fixed by the fixing tool;

wherein the fixing step includes fixing the composite body by sandwiching the first surface and a site of the composite body opposite to the first surface with the fixing tool.

7. A method for manufacturing a joined body using a rotary tool with a stirring pin to perform friction stirring on a composite body having a first surface and a second surface that is different from the first surface, wherein in the composite body, metal members are combined together in a joined arrangement, the method comprising:

an arrangement step of forming the composite body by combining the metal members in the arrangement;

a fixing step of fixing the composite body in a state where the metal members are combined together;

a first friction stirring step of performing friction stir welding by inserting the stirring pin through the first surface into the composite body that has been fixed;

a rotating step of rotating the fixed composite body such that the second surface is in a positional relationship to face the rotary tool; and a second friction stirring step of performing friction stir welding by inserting the stirring pin through the second surface into the fixed composite body;

wherein the fixing step includes fixing the composite body with a fixing tool by sandwiching the entire first surface except for a friction stirring site and the entire second surface except for a friction stirring site, the second surface being opposite to the first surface of the composite body.

8. The method for manufacturing a joined body according to claim 1, wherein the arrangement step includes overlapping the metal members on each other to form the composite body having an overlapped portion on the first surface or the second surface, in which the metal members are overlapped on each other, and the first friction stirring step or the second friction stirring step includes performing friction stir welding by inserting the stirring pin through the overlapped portion.

9. The method for manufacturing a joined body according to claim 1, wherein the arrangement step includes butting the metal members against each other to form the composite body having a butted portion on the first surface or the second surface, in which the metal members are butted against each other, and the first friction stirring step or the second friction stirring step includes performing friction stir welding by inserting the stirring pin through the butted portion.

* * * * *